(12) United States Patent
Xue et al.

(10) Patent No.: US 11,758,908 B2
(45) Date of Patent: Sep. 19, 2023

(54) HERBICIDAL COMPOSITION AND USE THEREOF

(71) Applicants: NANTONG JIANGSHAN AGROCHEMICAL & CHEMICALS CO., LTD., Nantong (CN); SHENYANG SINOCHEM AGROCHEMICALS R&D CO., LTD., Shenyang (CN)

(72) Inventors: Jian Xue, Nantong (CN); DongLiang Cui, Nantong (CN); JiChun Yang, Nantong (CN); XinFeng Ren, Nantong (CN); Hui Du, Nantong (CN); AiYing Guan, Nantong (CN); Lei Dong, Nantong (CN); YanMei Zhu, Nantong (CN); ChangLing Liu, Nantong (CN)

( * ) Notice: Subject to any disclaimer, the term of this patent is extended or adjusted under 35 U.S.C. 154(b) by 81 days.

(21) Appl. No.: 17/019,278

(22) Filed: Sep. 13, 2020

(65) Prior Publication Data

US 2021/0112813 A1 Apr. 22, 2021

Related U.S. Application Data

(63) Continuation of application No. PCT/CN2019/111695, filed on Oct. 17, 2019.

(51) Int. Cl.
| | |
|---|---|
| *A01N 43/80* | (2006.01) |
| *A01N 25/04* | (2006.01) |
| *A01N 25/14* | (2006.01) |
| *A01N 33/22* | (2006.01) |
| *A01N 37/22* | (2006.01) |
| *A01N 43/10* | (2006.01) |
| *A01N 43/50* | (2006.01) |
| *A01N 57/20* | (2006.01) |

(52) U.S. Cl.
CPC .......... *A01N 43/80* (2013.01); *A01N 25/04* (2013.01); *A01N 25/14* (2013.01); *A01N 33/22* (2013.01); *A01N 37/22* (2013.01); *A01N 43/10* (2013.01); *A01N 43/50* (2013.01); *A01N 57/20* (2013.01)

(58) Field of Classification Search
CPC ........ A01N 43/80; A01N 25/04; A01N 25/14; A01N 33/22; A01N 37/22; A01N 43/10; A01N 43/50; A01N 57/20

See application file for complete search history.

(56) References Cited

FOREIGN PATENT DOCUMENTS

| CN | 105394080 A | * | 3/2016 | ............. A01N 57/20 |
| CN | 108207997 | * | 6/2018 | ............. A01N 57/20 |
| WO | WO9940090 | * | 8/1999 | ........... C07D 471/04 |

OTHER PUBLICATIONS

English Translation of WO9940090, 1999, pp. 1-81. (Year: 1999).*
English Translation of CN108207997, 2018, pp. 1-11. (Year: 2018).*
Machine Translation of CH 105394080A, Mar. 2016, pp. 1-7. (Year: 2016).*

* cited by examiner

*Primary Examiner* — Trevor Love
(74) *Attorney, Agent, or Firm* — Jose Cherson Weissbrot

(57) ABSTRACT

Disclosed herein is a herbicidal composition, comprising an active component A and an active component B, wherein the active component B is one selected from the group consisting of glufosinate-ammonium, glufosinate-P-ammonium, oxyfluorfen, acetoflufen, imazethapyr, dimethoxamide, dimethoxamid-P, metolachlor, S-metolachlor, butachlor, acetochlor, pyroxasulfone, glyphosate and derivatives thereof.

3 Claims, No Drawings

HERBICIDAL COMPOSITION AND USE THEREOF

TECHNICAL FIELD

The present application relates to a compounding technology for agricultural herbicidal composition.

BACKGROUND

Varieties of herbicides containing a single active ingredient have different degrees of defects in the process of agricultural weeding: continuous use is easy to produce drug resistance, and the herbicidal spectrum is not wide enough; they can only control monocotyledonous or dicotyledonous weeds, or can only control emerged weeds or unemerged weeds, but not both. Compounding of two or more active components can improve the control effect, reduce the amount of effective ingredients used, save the cost of control, delay the generation of weed resistance, extend the service life of the agent, and reduce the pollution to the environment.

The application with the application number 201310267255.X discloses a herbicidal composition including glufosinate-ammonium and saflufenacil, of which the active ingredients are glufosinate-ammonium and saflufenacil, and the rest is pesticide adjuvants. The mass fraction ratio of areglufosinate-ammonium and saflufenacil in the herbicidal composition is 50:1~1:10, and the mass percentage of the total mass of areglufosinate-ammonium and saflufenacil in the herbicidal composition is 2~80%. The herbicidal composition of the present application can be prepared into one of suspending agents, oil suspending agents, water agents, wettable powders, or water-dispersible granules according to application needs, and is used for controlling non-cultivated weeds. The effect of the composition against non-cultivated weeds is obviously better than that of each single agent, which reduces the amount of medicine used and delays the resistance of weeds.

Active component A, chemical name: 3-(2-chloro-4-fluoro-5-(3-methyl-2,6-dioxo-4-trifluoromethyl-3,6-dihydropyrimidine-1(2H)-yl)phenyl)-5-methyl-4,5-dihydroisoxazole-5-carboxylic acid ethyl ester. Its unique structure is the combination of uracil structure and isoxazole structure. Compared with saflufenacil, it has better herbicidal activity and can effectively control annual and perennial weeds in garden fields and non-cultivated fields. However, the cost is higher.

SUMMARY

In a first aspect of the present application, provided is a herbicidal composition comprising an active component A and an active component B;

wherein the structure of the active component A is as follows:

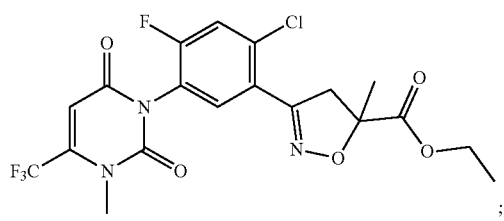

The active component B is one selected from the group consisting of glufosinate-ammonium, glufosinate-P-ammonium, oxyfluorfen, acetoflufen, imazethapyr, dimethoxamid-P, dimethoxamide, S-metolachlor, butachlor, acetochlor, glyphosate and derivatives thereof.

As a preferred embodiment of the present application, the mass ratio of the active component A and the active component B is 1:(1.5~10).

As a preferred embodiment of the present application, the mass ratio of the active component A and the active component B is 1:(2~6).

As a preferred embodiment of the present application, the mass ratio of the active component A and the active component B is 1:(2~3).

In a second aspect of the present application, provided is a herbicide comprising the above herbicidal composition.

In a third aspect of the present application, provided is an application of the herbicidal composition for controlling annual and perennial weeds in a garden field and a non-cultivated field.

As a preferred embodiment of the present application, when the herbicidal composition is used to control green bristlegrass, an amount of the active component A is 7.5~15 ga.i./hm$^2$, and the amount of the active component B is 75~180 ga.i./hm$^2$;

when the herbicidal composition is used to control weed lambsquarters, and the active component B is dimethoxamide or dimethoxamid-P, the amount of the active component A is 7.5~15 ga.i./hm$^2$, and the amount of the active component B is 75~180 ga.i./hm$^2$;

when the herbicidal composition is used to control weed lambsquarters, and the active component B is metolachlor or S-metolachlor, the amount of the active component A is 15~22.5 ga.i./hm$^2$, and the amount of the active component B is 90~135 ga.i./hm$^2$;

when the herbicidal composition is used to control weed abutilon, and the active component B is imazethapyr, pyroxasulfone, imazethapyr, glufosinate-ammonium or glufosinate-P-ammonium, the amount of the active component A is 7.5~30 ga.i./hm$^2$, and the amount of the active component B is 15~180 ga.i./hm$^2$;

when the herbicidal composition is used to control weed abutilon, and the active component B is imazethapyr or pyroxasulfone, the amount of the active component A is 7.5~15 ga.i./hm$^2$, and the amount of the active component B is 22.5~90 ga.i./hm$^2$.

As a preferred embodiment of the present application, the dosage form of the herbicide is emulsifiable concentrates, aqueous emulsions, microemulsions, suspoemulsions, wettable powders or water dispersible granules;

in addition to the active component A and the active component B, the preparing raw materials for the water dispersible granules also include surfactants, dispersants, antagonists, defoamers, disintegrants, binders, and solid carriers;

in addition to the active component A and the active component B, the preparing raw materials for the microemulsions also include surfactants, co-surfactants, organic solvents, and water;

in addition to the active component A and the active component B, a raw material for preparing the aqueous emulsion also include defoamers, water, antifreeze, emulsifiers and solvent oil;

in addition to the active component A and the active component B, the preparing raw materials for the emulsifiable concentrates also include organic solvents, solvent oil and emulsifier monomers;

in addition to the active component A and the active component B, a raw material for preparing the wettable powder further comprises a dispersant, a wetting agent and a defoamer.

As a preferred embodiment of the present application, the glyphosate and derivatives thereof are glyphosate or agrochemically suitable salts and esters thereof.

As a preferred embodiment of the present application, the glyphosate and derivatives thereof are glyphosate isopropylamine.

The beneficial effects of the present application are:

1. Compounding of two effective ingredients has obvious synergism, which improves the control effect;
2. Compounding of two effective ingredients has unique action mechanism without cross-resistance, and reduces the amount of pesticides used, thereby reducing costs and environmental pollution, which is conducive to pest resistance management;
3. When different B components are used, different A and B ratios and application rates per unit area are used to remove certain specific weeds, the herbicide of the present application has the control effect that other herbicides does not have. The promotion and application of the present application have huge economic and social benefits;
4. The composition of the present application utilizes the complementarity of different action mechanisms, has both contact and systemic properties, increases the adaptability to adverse environments such as field drought and low temperature, accelerates the reaction speed, and weeds more thoroughly;
5. The composition of the present application expands the appropriate period of application, especially for the larger-leaf age broad-leaved weeds, and the continuous inhibition and control effect are enhanced;
6. It has a very high control effect on some glyphosate-tolerant weeds such as horseweed herb, bermudagrass, goosegrass, etc.;
7. The stem and leaf spray treatment with the composition of the present application can be used to control most weeds in non-cultivated land, orchards, idle cultivated land, rubber plantations, eucalyptus forests, forests, fire lanes, lawns, railways, highways, airports, warehouses, etc.

DETAILED DESCRIPTION

The present application will be further described below in conjunction with specific examples, but the present application is not limited to these specific embodiments. Those skilled in the art should recognize that the present application covers all alternatives, improvements, and equivalents that may be included within the scope of the claims.

The object of the present application: to provide a herbicidal composition with significant synergy, low toxicity and low cost.

In a first aspect of present application provided is a herbicidal composition comprising an active component A and an active component B;

wherein the structure of the active component A is as follows:

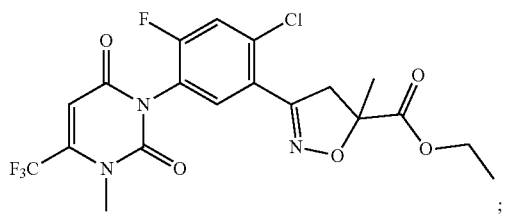 [SMILES: CCOC(=O)C1(C)CC(c2cc(-n3c(=O)cc(C(F)(F)F)n(C)c3=O)c(F)cc2Cl)=NO1]

The active component B is selected from one of glufosinate-ammonium, glufosinate-P-ammonium, oxyfluorfen, acetoflufen, imazethapyr, dimethoxamid-P, dimethoxamide, S-metolachlor, butachlor and acetochlor, or glyphosate and derivatives thereof.

In the present application, the glyphosate and derivatives thereof are glyphosate or agrochemically suitable salts and esters thereof.

As an embodiment of the present application, the mass ratio of the active component A and the active component B is 1:(1.5~10).

As an embodiment of the present application, the mass ratio of the active component A and the active component B is 1:(2~6).

As a preferred embodiment of the present application, the mass ratio of the active component A and the active component B is 1:(2~3).

In a second aspect of the present application, provided is a herbicide comprising the above herbicidal composition.

The dosage form of the herbicide is emulsifiable concentrates, aqueous emulsions, microemulsions, suspoemulsions, wettable powders or water dispersible granules;

Emulsifiable Concentrate

In addition to the active component A and the active component B, the emulsifiable concentrate further comprises an organic solvent, a solvent oil and an emulsifier monomer.

In the present application, the organic solvent in the emulsifiable concentrate is selected from: toluene, xylene, chlorobenzene, α-methylnaphthalene, turpentine, dichloromethane, chloroform, methanol, ethanol, isopropanol, butanol, isoamyl alcohol, cyclohexanone, isophorone, acetophenone, ethyl acetate, butyl acetate, N,N-dimethylformamide, dimethyl sulfoxide, methyl cellosolve, ethyl cellosolve, etc.

As a preferred embodiment of the present application, the organic solvent in the emulsifiable concentrate is cyclohexanone.

In the present application, the solvent oil in the emulsifiable concentrate is 150 #solvent oil.

In the present application, the emulsifier monomer in the emulsifiable concentrate is calcium dodecylbenzenesulfonate (emulsifier 500 #).

Aqueous Emulsion

In addition to the active component A and the active component B, a raw material for preparing the aqueous emulsion further includes defoamers, water, antifreeze, emulsifiers and solvent oil;

In the present application, the defoamer is selected from GPE, silicone defoamers, C8~10 fatty alcohols, C10~20 saturated fatty acids, amide and other defoamers.

In the present application, the defoamer of the aqueous emulsion is a GPE polyether defoamer, that is, GPE, and its active ingredient is polyoxypropylenepolyoxyethylene regular glycol ether; the hydroxyl value is 45-56 mgKOH/g; the acid value is ≤0.5 mgKOH/g; and the molecular weight is 3000~3800. Commodity brand is Changfeng.

In the present application, the antifreeze is selected from one or more of sorbitol, ethylene glycol, glycerin, isopropanol and butanol.

As a preferred embodiment of the present application, the antifreeze is selected from sorbitol and/or ethylene glycol.

As a preferred embodiment of the present application, the antifreeze in the aqueous emulsion is sorbitol.

In the present application, the emulsifier is selected from one of octylphenylpolyoxyethylene ether (CAS number: 9002-93-1), dibenzyl biphenyl polyoxyethylene ether (emulsifier 300 #), calcium dodecylbenzenesulfonate (emulsifier 500 #), tristyrylphenolpolyoxyethylene ether (emulsifier 600 #), and alkylphenol formaldehyde resin polyoxyethylene ether (emulsifier 700 #).

As a preferred embodiment of the present application, the emulsifier in the aqueous emulsion is emulsifier 300 #.

Microemulsion

In addition to the active component A and the active component B, a raw material for preparing the microemulsions further include surfactants, co-surfactants, organic solvents, and water;

In the present application, the surfactant in the microemulsion is selected from one of octylphenylpolyoxyethylene ether (CAS number: 9002-93-1), dibenzyl biphenyl polyoxyethylene ether (emulsifier 300 #), calcium dodecylbenzenesulfonate (emulsifier 500 #), tristyrylphenolpolyoxyethylene ether (emulsifier 600 #), and alkylphenol formaldehyde resin polyoxyethylene ether (emulsifier 700 #).

In the present application, the surfactant in the microemulsion is emulsifier 500 #; and the co-surfactant is 2-methyl-2-propanol.

Suspension Emulsion

In addition to the active component A and the active component B, a raw material for preparing the suspension emulsion further includes cyclohexanone, SE3700A, SE3700B, ethylene glycol, xanthan gum, sodium benzoate, a defoamer, and water.

The SE3700A is a brand of polyether emulsifier, Huntsman SE3700A.

The SE3700B is a brand of a mixture of anionic and nonionic surfactants, AkzoNobel SE3700B.

Wettable Powder

In addition to the active component A and the active component B, a raw material for preparing the wettable powder further comprises a dispersant, a wetting agent and a defoamer.

The dispersant is selected from one or more of naphthalene or alkylnaphthalene formaldehyde condensate sulfonate, fatty alcohol ethylene oxide adduct sulfonate, alkylphenolpolyoxyethylene ether sulfonate, polycarboxylate, fatty alcohol ethylene oxide adduct phosphate, alkylphenolpolyoxyethylene ether formaldehyde condensate sulfate, polyoxyethylenepolyoxypropylene ether block copolymer, alkylphenolpolyoxyethylene ether phosphate, lignosulfonate, gelatin, gum arabic, carboxymethyl cellulose, polyoxyethylene alcohol, polyvinylpyrrolidone, sodium polyacrylate, and polyethylene glycol.

As a preferred embodiment of the present application, the dispersant of the wettable powder is calcium lignosulfonate.

The wetting agent is selected from one of fatty alcohol sulfate, alkyl alcohol polyoxyethylene ether sodium sulfate, alkylphenolpolyoxyethylene ether sodium sulfate, alkylphenolpolyoxyethylene ether formaldehyde condensate sulfate, sodium alkyl sulfate, alkylnaphthalene sulfonate, fatty alcohol ethylene oxide adduct sulfonate, alkylphenol formaldehyde condensate ethylene oxide adduct sulfonate, alkylamide sulfonate, fatty alcohol polyoxyethylene ether, alkylphenolpolyoxyethylene ether, trihydrate alcohol fatty acid ester, trihydrate alcohol fatty acid ester polyoxyethylene agent ether, polyoxyethylenepolyoxypropylene ether block copolymer, alkylphenol formaldehyde condensate polyoxyethylene ether.

As an embodiment of the present application, the wetting agent of the wettable powder is fatty alcohol polyoxyethylene ether, specifically AEO9.

In the present application, the filler of the wettable powder is attapulgite.

Water Dispersible Granule

In addition to the active component A and the active component B, a raw material for preparing the water dispersible granules further includes a surfactant, a dispersant, an antagonist, a defoamer, a disintegrant, a binder, and a solid carrier;

The surfactant of the water dispersible granule is sodium dodecyl sulfate.

The dispersant of the water-dispersible granule is naphthalene sulfonate formaldehyde condensate.

The antagonist of the water dispersible granule is ammonium sulfate.

The defoamer of the water dispersible granule is BASF ST2292 defoamer.

The solid carrier of the water dispersible granule is kaolin.

In a third aspect of present application, provided is an application of the herbicidal composition for controlling annual and perennial weeds in a garden field and a non-cultivated field.

when the herbicidal composition is used to control green bristlegrass, an amount of the active component A is 7.5~15 ga.i./hm$^2$, and the amount of the active component B is 75~180 ga.i./hm$^2$;

when the herbicidal composition is used to control weed lambsquarters, and the active component B is dimethoxamide or dimethoxamid-P, the amount of the active component A is 7.5~15 ga.i./hm$^2$, and the amount of the active component B is 75~180 ga.i./hm$^2$;

when the herbicidal composition is used to control weed lambsquarters, and the active component B is metolachlor or S-metolachlor, the amount of the active component A is 15~22.5 ga.i./hm$^2$, and the amount of the active component B is 90~135 ga.i./hm$^2$;

when the herbicidal composition is used to control weed abutilon, and the active component B is imazethapyr, pyroxasulfone, imazethapyr, glufosinate-ammonium or glufosinate-P-ammonium, the amount of the active component A is 7.5~30 ga.i./hm$^2$, and the amount of the active component B is 15~180 ga.i./hm$^2$;

when the herbicidal composition is used to control weed abutilon, and the active component B is imazethapyr or pyroxasulfone, the amount of the active component A is 7.5~15 ga.i./hm$^2$, and the amount of the active component B is 22.5~90 ga.i./hm$^2$.

The content of the present application will be further described in detail in conjunction with the following examples. The content mentioned in the examples is not a limitation of the present application. The choice of material formula can be tailored to local conditions and has no substantial effect on the results. In these examples, all percentages are by weight unless otherwise stated.

DOSAGE FORM PREPARATION EXAMPLES

Example 1: Water Dispersible Granule Comprising 60% of Active Component A and Glufosinate-Ammonium (Glufosinate-P-Ammonium)

| | |
|---|---|
| active component A | 20% |
| Glufosinate-ammonium (glufosinate-P-ammonium) | 40% |
| Sodium dodecyl sulfate | 4% |
| Naphthalene sulfonate formaldehyde condensate | 6% |
| Ammonium sulfate | 5% |
| BASF ST2292 defoamer | 0.1% |
| Kaolin was used to complement. | |

The preparation method was as follows: the above materials were added together in a conical mixer to mix evenly, and then crushed by an airflow crusher. The crushed materials were mixed by a conical mixer. 98% of the mixed materials were passed through a 600 mesh standard sieve, and added to a kneader to form plastic materials. The materials were finally put into an extrusion granulator to extrude and granulate. After granulation, the materials were dried and sieved to obtain a water dispersible granule comprising 60% active component A and (glufosinate-P-ammonium) glufosinate-ammonium.

Example 2: Microemulsion Comprising 22% of Active Component A and Dimethoxamide (Dimethoxamid-P)

| | |
|---|---|
| active component A | 2% |
| Dimethoxamide (dimethoxamid-P) | 20% |
| Cyclohexanone | 10% |
| 2-methyl-2-propanol | 10% |
| Emulsifier 500# | 20% |
| Water was used to complement to 100% | |

The preparation method was as follows: after fully dissolving the active ingredients active component A and (dimethoate-P) dimethoate with a solvent, emulsifier 500 # and 2-methyl-2-propanol were added to mix well, and finally tap water was added. The mixture was thoroughly stirred to obtain a microemulsion comprising 22% of active component A and dimethoate (dimethoate-P).

Example 3: Aqueous Emulsion Comprising 35% of Active Ingredient A and Metolachlor (S-Metolachlor)

| | |
|---|---|
| active component A | 5% |
| Metolachlor (S-metolachlor) | 30% |
| 150# solvent oil | 10% |
| EO-PO block polyether | 3% |
| Ethylene glycol | 3% |
| GPE polyether defoamer | 0.2% |
| Deionized water was used to complement to 100% | |

The preparation method was as follows: after dissolving the active ingredients active component A and metolachlor (S-metolachlor) with a solvent, an emulsifier was added to mix and stir well to form a homogeneous liquid, as an oil phase component; antifreeze glycol, GPE polyether defoamer, and deionized water were mixed and stirred well as a water phase. Using a high-speed shearing machine, the oil phase was drawn into the water phase and fully sheared to obtain an aqueous emulsion comprising 35% of active ingredient A and metolachlor (S-metolachlor).

Example 4: Emulsifiable Concentrate Comprising 25% of Active Component A and Oxyfluorfen

| | |
|---|---|
| active component A | 10% |
| Oxyfluorfen | 15% |
| Cyclohexanone | 10%, |
| 500# | 2%, |
| 1602 | 4% |
| 150# solvent oil was used to complement to 100%. | |

The preparation method was as follows: the active ingredients active component A and oxyfluorfen, cyclohexanone, emulsifier monomer 500 #, emulsifier monomer 1602, 150 # solvent oil were sequentially put into a stirring kettle, and fully heated and stirred to obtain an emulsifiable concentrate product comprising 25% of active component A and oxyfluorfen.

Example 5: Wettable Powder Comprising 34% of Active Component A and Imazethapyr

| | |
|---|---|
| active component A | 8.9%, |
| Imazethapyr | 25.1%, |
| Fatty alcohol polyoxyethylene ether | 6%, |
| Calcium lignosulfonate | 4%, |
| Filling attapulgite was used to complement to 100%. | |

The preparation method was as follows: the active ingredients and each auxiliary were mixed well, put into a mechanical pulverizer for coarse pulverization, then pulverized by air flow, and then mixed well to obtain a wettable powder comprising 34% of active component A and imazethapyr.

Example 6: Suspoemulsion Comprising 35% of Active Component A and Pyroxasulfone

| | |
|---|---|
| active component A | 5% |
| Pyroxasulfone | 30% |
| Cyclohexanone | 10% |
| SE3700A | 6% |
| SE3700B | 9% |
| Ethylene glycol | 3% |
| Xanthan gum | 0.12% |
| Sodium benzoate | 0.2% |
| BASF 8034A defoamer | 0.2% |
| Deionized water was used to complement to 100%. | |

The preparation method was as follows: each component was weighed according to the formula. Pyroxasulfone crude drug, dispersants, wetting agents and other auxiliaries, and a part of water were coarsely sheared, and directly sanded in a sanding mill to obtain a suspending agent; active component A, cosolvent cyclohexanone, emulsifiers and other auxiliaries, and part of water were put into a high-shear emulsification kettle and sheared at high speed to obtain an aqueous emulsion; the suspending agent and the aqueous emulsion were added according to a certain ratio and added with auxiliaries to mix well to obtain a finished suspoemulsion product.

Example 7: Aqueous Suspension Comprising 50% of Active Component A and Glyphosate active component A: 30%
Glyphosate isopropylamine (by acid): 20%
Dispersant: 5%
Wetting agent: 2%
Sorbitol: 3%
Thickener: 0.15%
Defoamer: 0.2%
The remaining amount was made up with water.

Example 8: Water Dispersible Granule Comprising 60% of Active Component A and Glyphosate Component A: 20%
Glyphosate isopropylamine (by acid): 40%
Dispersant (sodium lignosulfonate): 4%
Wetting agent (fatty alcohol polyoxyethylene ether): 50.1%~8%
Disintegrant (calcium chloride): 3%
BASF ST2292 defoamer: 0.1%
Binder (magnesium aluminum silicate): 6%
The remaining amount was made up with kaolin.

Example 9: Wettable Powder Comprising 37% of Active Component A and Glyphosate active component A: 9.1%
Glyphosate isopropylamine (by acid): 27.9%
Sodium ether sulfate: 2.1%
Sodium alkanoamide sulfonate: 3.6%
The remaining amount was made up with attapulgite.

Examples of Indoor Biological Activity Determination

In the present application, indoor combined action of the compound of herbicide active component A and B on weeds was measured to determine the combined effect of the composition on weeds, wherein the structure of the active component A was as follows:

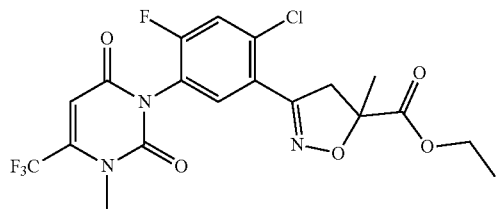

was one of glufosinate-ammonium, glufosinate-P-ammonium, dimethoxamide, dimethoxamid-P, metolachlor, S-metolachlor, butachlor, acetochlor, oxyfluorfen, acetofluran, imazethapyr, and pyroxasulfone.

The weed cultivation method was as follows: quantitative weed seeds abutilon and bristlegrass were respectively sown in a paper cup filled with nutrient soil with a diameter of 7 cm, and then cultivated in the greenhouse after covering the soil, suppressing and watering. The post-emergence stem and leaf treatment was performed when the grass weeds grew to 5-7 leaf stage, broad-leaved weeds grew to 6-8 leaf stage; the pre-emergence soil treatment was performed the second day after sowing, and the early post-emergence treatment was performed after sowing and before emergence; the experiment was repeated 3 times. After the treatment and drug solution naturally dried, the weeds were placed in the greenhouse to be managed according to conventional methods. According to the suppression or death of the weeds, a visual control effect investigation was conducted 30 days after the treatment. The application adopted the Gowing method to evaluate the combined effect of the proposed composition.

$$\text{theoretical value } E_0 = X + Y - \frac{XY}{100}$$

In the formula:
X—Weed control effect when the amount of herbicide component A is P;
Y—Weed control effect when the amount of herbicide component B is Q;
$E_0$—Theoretical control effect when the amount of herbicide component A is P+theoretical control effect when the amount of herbicide component B is Q;
E—The measured control effect after the herbicide component A and the herbicide component B are mixed according to the above ratio.

When $E-E_0>10\%$, it is synergism; when $E-E_0<-10\%$, it is antagonism; when $E-E_0$ value is between ±10%, it is addition.

Example 10

TABLE 1

Combined effect of the mixed use of active component A and dimethoxamide (dimethoxamid-P) on weeds (pre-emergence)

| Medicament | Dose (ga.i./hm²) | Bristlegrass | | | Lambsquarters | | |
| --- | --- | --- | --- | --- | --- | --- | --- |
| | | Measured value E | Theoretical value $E_0$ | $E - E_0$ | Measured value E | Theoretical value $E_0$ | $E - E_0$ |
| active component A | 7.5 | 0 | — | — | 5 | — | — |
| | 15 | 15 | — | — | 20 | — | — |
| Dimethoxamide | 75 | 25 | — | — | 20 | — | — |
| | 150 | 40 | — | — | 35 | — | — |

TABLE 1-continued

Combined effect of the mixed use of active component A and
dimethoxamide (dimethoxamid-P) on weeds (pre-emergence)

| Medicament | Dose (ga.i./hm$^2$) | Bristlegrass | | | Lambsquarters | | |
|---|---|---|---|---|---|---|---|
| | | Measured value E | Theoretical value $E_0$ | $E - E_0$ | Measured value E | Theoretical value $E_0$ | $E - E_0$ |
| Dimethoxamid-P | 75 | 30 | — | — | 35 | — | — |
| | 150 | 55 | — | — | 50 | — | — |
| active component A + dimethoxamide | 7.5 + 75 | 45 | 25.0 | 20.0 | 35 | 24.0 | 11.0 |
| | 15 + 150 | 65 | 49.0 | 16.0 | 75 | 48.0 | 27.0 |
| active component A + dimethoxamid-P | 7.5 + 75 | 55 | 30.0 | 25.0 | 55 | 38.3 | 16.7 |
| | 15 + 150 | 80 | 61.8 | 18.2 | 85 | 60.0 | 25.0 |

TABLE 2

Combined effect of the mixed use of active component A and
metolachlor (S-metolachlor) on weeds (pre-emergence)

| Medicament | Dose (ga.i./hm$^2$) | Bristlegrass | | | Lambsquarters | | |
|---|---|---|---|---|---|---|---|
| | | Measured value E | Theoretical value $E_0$ | $E - E_0$ | Measured value E | Theoretical value $E_0$ | $E - E_0$ |
| active component A | 15 | 10 | — | — | 15 | — | — |
| | 22.5 | 25 | — | — | 25 | — | — |
| metolachlor | 90 | 40 | — | — | 50 | — | — |
| | 135 | 60 | — | — | 55 | — | — |
| S-metolachlor | 90 | 35 | — | — | 45 | — | — |
| | 135 | 60 | — | — | 65 | — | — |
| active component A + metolachlor | 15 + 90 | 60 | 47.5 | 12.5 | 80 | 57.5 | 22.5 |
| | 22.5 + 135 | 95 | 70.0 | 25.0 | 90 | 66.3 | 23.7 |
| active component A + S-metolachlor | 15 + 90 | 70 | 41.5 | 28.5 | 80 | 53.3 | 26.7 |
| | 22.5 + 135 | 95 | 70.0 | 25.0 | 95 | 73.7 | 21.3 |

TABLE 3

Combined effect of the mixed use of active component
A and butachlor\acetochlor on weeds (pre-emergence)

| Medicament | Dose (ga.i./hm$^2$) | Bristlegrass | | | *Eclipta alba* | | |
|---|---|---|---|---|---|---|---|
| | | Measured value E | Theoretical value $E_0$ | $E - E_0$ | Measured value E | Theoretical value $E_0$ | $E - E_0$ |
| active component A | 7.5 | 0 | — | — | 0 | — | — |
| | 15 | 10 | — | — | 10 | — | — |
| Butachlor | 75 | 45 | — | — | 15 | — | — |
| | 150 | 60 | — | — | 25 | — | — |
| Acetochlor | 75 | 50 | — | — | 10 | — | — |
| | 150 | 75 | — | — | 35 | — | — |
| active component A + butachlor | 7.5 + 75 | 60 | 45.0 | 15.0 | 30 | 15.0 | 15.0 |
| | 15 + 150 | 85 | 64.0 | 21.0 | 55 | 32.5 | 22.5 |
| active component A + acetochlor | 7.5 + 75 | 70 | 50.0 | 20.0 | 25 | 10.0 | 15.0 |
| | 15 + 150 | 90 | 77.5 | 12.5 | 60 | 41.5 | 18.5 |

The test results (Table 1 to Table 3) indicated that under greenhouse conditions, the mixed use of the active component A and the amide herbicides dimethoxamide, dimethoxamid-P, metolachlor, S-metolachlor, butachlor, acetochlor for pre-emergence soil treatment had obvious synergism.

Example 11

TABLE 4

Combined effect of the mixed use of active component A and imazethapyr\pyroxasulfone on weeds (pre-emergence)

| Medicament | Dose (ga.i./hm$^2$) | Bristlegrass | | | Abutilon | | |
|---|---|---|---|---|---|---|---|
| | | Measured value E | Theoretical value $E_0$ | $E - E_0$ | Measured value E | Theoretical value $E_0$ | $E - E_0$ |
| active component A | 15 | 10 | — | — | 5 | — | — |
| | 30 | 15 | — | — | 20 | — | — |
| Imazethapyr | 45 | 30 | — | — | 5 | — | — |
| | 90 | 45 | — | — | 25 | — | — |
| Pyroxasulfone | 90 | 60 | — | — | 40 | — | — |
| | 180 | 75 | — | — | 55 | — | — |
| active component A + Imazethapyr | 15 + 45 | 55 | 38.5 | 16.5 | 30 | 9.8 | 20.2 |
| | 30 + 90 | 75 | 53.3 | 21.7 | 60 | 40.0 | 20.0 |
| active component A + Pyroxasulfone | 15 + 90 | 80 | 64.0 | 16.0 | 60 | 43.0 | 17.0 |
| | 30 + 180 | 95 | 78.8 | 16.2 | 85 | 64.0 | 21.0 |

TABLE 5

Combined effect of the mixed use of active component A and butachlor\acetochlor on weeds (post-emergence)

| Medicament | Dose (ga.i./hm$^2$) | Bristlegrass | | | Abutilon | | |
|---|---|---|---|---|---|---|---|
| | | Measured value E | Theoretical value $E_0$ | $E - E_0$ | Measured value E | Theoretical value $E_0$ | $E - E_0$ |
| active component A | 7.5 | 5 | — | — | 10 | — | — |
| | 15 | 10 | — | — | 15 | — | — |
| Imazethapyr | 22.5 | 45 | — | — | 10 | — | — |
| | 45 | 50 | — | — | 20 | — | — |
| Pyroxasulfone | 45 | 70 | — | — | 50 | — | — |
| | 90 | 85 | — | — | 65 | — | — |
| active component A + Imazethapyr | 7.5 + 22.5 | 65 | 49.5 | 15.5 | 40 | 19.0 | 21.0 |
| | 15 + 45 | 80 | 55.0 | 25.0 | 55 | 32.0 | 23.0 |
| active component A + Pyroxasulfone | 7.5 + 45 | 95 | 71.5 | 23.5 | 75 | 55.0 | 20.0 |
| | 15 + 90 | 100 | 86.5 | 13.5 | 90 | 70.3 | 19.7 |

The test results (Table 4 and Table 5) indicated that under greenhouse conditions, the mixed use of the active component A and imazethapyr and pyroxasulfone for pre-emergence soil treatment and post-emergence stem and leaf treatment both had obvious synergism.

TABLE 6

Combined effect of the mixed use of active component A and glufosinate-ammonium (glufosinate-P-ammonium) on weeds

| Medicament | Dose (ga.i./hm$^2$) | Bristlegrass | | | Abutilon | | |
|---|---|---|---|---|---|---|---|
| | | Measured value E | Theoretical value $E_0$ | $E - E_0$ | Measured value E | Theoretical value $E_0$ | $E - E_0$ |
| active component A | 15 | 10 | — | — | 35 | — | — |
| | 60 | 35 | — | — | 45 | — | — |
| Glufosinate-ammonium | 30 | 30 | — | — | 40 | — | — |
| | 120 | 55 | — | — | 60 | — | — |
| Glufosinate-P-ammonium | 30 | 40 | — | — | 45 | — | — |
| | 120 | 65 | — | — | 65 | — | — |

TABLE 6-continued

Combined effect of the mixed use of active component A and
glufosinate-ammonium (glufosinate-P-ammonium) on weeds

|  |  | Bristlegrass | | | Abutilon | | |
| --- | --- | --- | --- | --- | --- | --- | --- |
| Medicament | Dose (ga.i./hm²) | Measured value E | Theoretical value $E_0$ | $E - E_0$ | Measured value E | Theoretical value $E_0$ | $E - E_0$ |
| active component A + glufosinate-ammonium | 15 + 30 | 55 | 37.0 | 18.0 | 80 | 61.0 | 19.0 |
|  | 60 + 120 | 90 | 70.8 | 19.3 | 100 | 78.0 | 22.0 |
| active component A + glufosinate-P-ammonium | 15 + 30 | 65 | 46.0 | 19.0 | 80 | 64.3 | 15.8 |
|  | 60 + 120 | 95 | 77.3 | 17.8 | 100 | 80.8 | 19.3 |

TABLE 7

Combined effect of the mixed use of active component A and oxyfluorfen\acetofluran on weeds

|  |  | Bristlegrass | | | *Amaranthusretroflexus* | | |
| --- | --- | --- | --- | --- | --- | --- | --- |
| Medicament | Dose (ga.i./hm²) | Measured value E | Theoretical value $E_0$ | $E - E_0$ | Measured value E | Theoretical value $E_0$ | $E - E_0$ |
| active component A | 15 | 20 | — | — | 20 | | |
|  | 30 | 50 | — | — | 65 | | |
| Oxyfluorfen | 22.5 | 15 | — | — | 30 | | |
|  | 45 | 50 | — | — | 60 | | |
| Acetofluran | 60 | 5 | — | — | 35 | | |
|  | 90 | 30 | — | — | 55 | | |
| active component A + oxyfluorfen | 15 + 22.5 | 50 | 32.0 | 18.0 | 65 | 44.0 | 21.0 |
|  | 30 + 45 | 98 | 75.0 | 23.0 | 100 | 86.0 | 14.0 |
| active component A + acetofluran | 15 + 60 | 40 | 24.0 | 16.0 | 70 | 48.0 | 22.0 |
|  | 30 + 90 | 90 | 65.0 | 25.0 | 100 | 84.3 | 15.7 |

The test results (Table 6 and Table 7) indicated that under greenhouse conditions, the mixed use of the active component A and one of organophosphorus herbicides glufosinate-ammonium and glufosinate-P-ammonium, or diphenyl ether herbicides oxyfluorfen and acetofluran all had obvious synergism.

Example 12 Determination of Indoor Combined Effect of Compounding of Active Component A and Active Component B on Weeds The combined effect of the composition on the weeds was clarified by the indoor pot experiment.

The weed cultivation and test material cultivation method was as follows: quantitative weed seeds abutilon and bristlegrass were respectively sown in a paper cup filled with nutrient soil with a diameter of 7 cm, and then cultivated in the greenhouse after covering the soil, suppressing and watering. The stem and leaf spray treatment was performed when the grass weeds grew to 5-7 leaf stage, and broad-leaved weeds grew to 6-8 leaf stage; the tests were repeated for 3 times. the treatment and drug solution naturally dried, the weeds were placed in the greenhouse to be managed according to conventional methods. According to the suppression or death of the weeds, a visual control effect investigation was conducted 30 days after the treatment.

The application adopted the Gowing method to evaluate the combined effect of the proposed composition.

$$\text{theoretical value } E_0 = X + Y - \frac{XY}{100}$$

In the formula:
X—Weed control effect when the amount of herbicide component A is P;
Y—Weed control effect when the amount of herbicide component B is Q;
$E_0$—Theoretical control effect when the amount of herbicide component A is P+theoretical control effect when the amount of herbicide component B is Q;
E—The measured control effect after the herbicide component A and the herbicide component B are mixed according to the above ratio.

When $E-E_0 > 10\%$, it is synergism; when $E-E_0 < -10\%$, it is antagonism; when $E-E_0$ value is between ±10%, it is addition.

TABLE 1

Combined effect of the mixed use of active component A and active component B

|  |  | Abutilon | | | Bristlegrass | | |
| --- | --- | --- | --- | --- | --- | --- | --- |
| Medicament | Dose (ga.i./hm²) | Measured value E | Theoretical value E0 | E − E0 | Measured value E | Theoretical value E0 | E − E0 |
| Component A | 3.75 | 10 | — | — | 5 | — | — |
|  | 7.5 | 25 | — | — | 10 | — | — |
|  | 15 | 40 | — | — | 15 | — | — |
|  | 30 | 55 | — | — | 25 | — | — |

TABLE 1-continued

Combined effect of the mixed use of active component A and active component B

| Medicament | Dose (ga.i./hm²) | Abutilon | | | Bristlegrass | | |
|---|---|---|---|---|---|---|---|
| | | Measured value E | Theoretical value E0 | E − E0 | Measured value E | Theoretical value E0 | E − E0 |
| Glyphosate isopropylamine B | 37.5 | 10 | — | — | 0 | — | — |
| | 75 | 20 | — | — | 15 | — | — |
| | 150 | 50 | — | — | 30 | — | — |
| | 300 | 65 | — | — | 45 | — | — |
| Component A + glyphosate isopropylamine B | 3.75 + 37.5 | 35 | 19.0 | 16 | 20 | 5.0 | 15.0 |
| | 7.5 + 37.5 | 45 | 32.5 | 12.5 | 30 | 10.0 | 20.0 |
| | 7.5 + 75 | 60 | 40.0 | 20.0 | 45 | 23.5 | 21.5 |
| | 15 + 37.5 | 60 | 46.0 | 14.0 | 30 | 15.0 | 15.0 |
| | 15 + 75 | 70 | 52.0 | 18.0 | 50 | 27.8 | 22.2 |
| | 15 + 150 | 90 | 70.0 | 20.0 | 70 | 40.5 | 29.5 |
| | 30 + 37.5 | 75 | 59.5 | 15.5 | 45 | 25.0 | 20.0 |
| | 30 + 75 | 80 | 64.0 | 16.0 | 55 | 36.2 | 18.8 |
| | 30 + 150 | 95 | 77.5 | 17.5 | 65 | 47.5 | 17.5 |
| | 30 + 300 | 100 | 84.2 | 15.8 | 85 | 58.8 | 26.2 |

The test results (Table 1) indicated that the mixed use of active component A with active component B glyphosate isopropylamine showed obvious addition or synergism to broad-leaved weed abutilon and gramineous weed barnyardgrass.

Example 13

The test targets were horseweed herb collected from Shenyang, Liaoning and goosegrass collected from Zhengzhou, Henan.

TABLE 2

Combined effect of the mixed use of active component A and active component B on non-glyphosate resistant or tolerant weeds

| Medicament | Dose (ga.i./hm²) | Horseweed herb (collected from Shenyang, Liaoning) | | | goosegrass (collected from Zhengzhou, Henan) | | |
|---|---|---|---|---|---|---|---|
| | | Measured value E | Theoretical value E0 | E − E0 | Measured value E | Theoretical value E0 | E − E0 |
| Component A | 3.75 | 10 | — | — | 5 | — | — |
| | 7.5 | 30 | — | — | 15 | — | — |
| | 15 | 35 | — | — | 30 | — | — |
| | 30 | 55 | — | — | 45 | — | — |
| Glyphosate isopropylamine | 37.5 | 25 | — | — | 5 | — | — |
| | 75 | 35 | — | — | 25 | — | — |
| | 150 | 65 | — | — | 50 | — | — |
| | 300 | 70 | — | — | 65 | — | — |
| Component A + glyphosate isopropylamine B | 3.75 + 37.5 | 50 | 32.5 | 27.5 | 25 | 9.8 | 15.2 |
| | 7.5 + 37.5 | 60 | 47.5 | 12.5 | 35 | 19.2 | 15.8 |
| | 7.5 + 75 | 70 | 54.5 | 15.5 | 50 | 36.2 | 13.8 |
| | 15 + 37.5 | 65 | 51.2 | 13.8 | 45 | 33.5 | 11.5 |
| | 15 + 75 | 75 | 57.8 | 17.2 | 65 | 47.5 | 17.5 |
| | 15 + 150 | 90 | 77.2 | 12.8 | 85 | 65.0 | 20.0 |
| | 30 + 75 | 85 | 70.8 | 14.2 | 80 | 58.8 | 21.2 |
| | 30 + 150 | 98 | 84.2 | 13.8 | 95 | 72.5 | 22.5 |
| | 30 + 300 | 100 | 86.5 | 13.5 | 98 | 80.8 | 17.2 |

The test results (Table 2) indicated that the combined effect of the mixed use of active component A with active component B glyphosate isopropylamine on non-glyphosate resistant or tolerant weeds, or tolerant weeds horseweed herb and goosegrass, is obvious synergism.

Field Herbicidal Activity Determination Example

Example 14

The present application also conducted a medicinal efficacy test on weeds on the formulation examples containing herbicide active component A and active component B by the field plot test method, and clarified the control effect of the composition on non-cultivated weeds.

According to the different components of different formulation examples, pre-emergence soil treatment, early post-emergence and post-emergence stem and leaf spray treatment were carried out respectively. The spraying device was Singapore Linong HD400 hand-operating knapsack sprayer (No. H17001), working pressure: 45 Pa, spray rate: 640 mL/min, adjustable cone spraying nozzle (325787), spraying nozzle height: 0.5 m, spray width: 0.85 m, walking speed: about 16.7 m/min, and spray volume: 4501/ha;

TABLE 8

Control effect of the herbicidal composition comprising active
component A and amide on non-cultivated weeds (pre-emergence)

| Medicament | Dose (ga.i./hm²) | Crab-grass | Bristle-grass | Lambs-quarters | Amaranthus-retroflexus |
|---|---|---|---|---|---|
| Example 2 composition | 200 | 50 | 40 | 55 | 50 |
|  | 400 | 85 | 65 | 90 | 95 |
|  | 600 | 100 | 90 | 98 | 100 |
| Example 3 composition | 200 | 70 | 60 | 70 | 60 |
|  | 400 | 85 | 90 | 80 | 80 |
|  | 600 | 98 | 95 | 98 | 100 |
| Dimethoxamide | 600 | 70 | 50 | 70 | 55 |
| Dimethoxamid-P | 600 | 70 | 55 | 75 | 80 |
| metolachlor | 600 | 60 | 45 | 50 | 60 |
| S-metolachlor | 600 | 70 | 60 | 50 | 75 |

TABLE 9

Control effect of the herbicidal composition comprising
active componentA, imazethapyr and pyroxasulfone
on non-cultivated weeds (early post-emergence)

| Medicament | Dose (ga.i./hm²) | Echino-chloacrus-galli | Bristle-grass | Amaranthus-retroflexus | Abutilon |
|---|---|---|---|---|---|
| Example 5 composition | 50 | 30 | 25 | 40 | 15 |
|  | 100 | 80 | 75 | 90 | 60 |
|  | 200 | 100 | 90 | 100 | 90 |
| Example 6 composition | 100 | 55 | 60 | 70 | 55 |
|  | 200 | 75 | 80 | 80 | 85 |
|  | 400 | 100 | 95 | 90 | 100 |
| Imazethapyr | 100 | 60 | 50 | 70 | 45 |
| Pyroxasulfone | 200 | 15 | 35 | 60 | 30 |

TABLE 10

Control effect of the herbicidal composition comprising
active component A and organophosphorus and diphenyl
ether on non-cultivated weeds (post-emergence)

| Medicament | Dose (ga.i./hm²) | Echino-chloacrus-galli | Bristle-grass | Amaranthus-retroflexus | Abutilon |
|---|---|---|---|---|---|
| Example 1 composition | 100 | 60 | 70 | 85 | 90 |
|  | 200 | 90 | 95 | 95 | 90 |
|  | 300 | 100 | 95 | 98 | 100 |
| Example 4 composition | 50 | 40 | 25 | 15 | 30 |
|  | 100 | 95 | 98 | 100 | 90 |
|  | 200 | 100 | 100 | 100 | 100 |
| Glufosinate-ammonium | 100 | 60 | 50 | 70 | 65 |
| Glufosinate-P-ammonium | 100 | 60 | 45 | 80 | 70 |
| Oxyfluorfen | 100 | 85 | 65 | 80 | 80 |
| Acetofluran | 100 | 70 | 55 | 75 | 75 |

The test results (Table 8 to Table 10) indicated that the formulation examples containing herbicide active component A and active component B had a good control effect on most broad-leaved weeds and gramineous weeds.

Example 15

The death rate of weeds after application of the herbicidal composition of the present application was measured and compared with the herbicidal rate when a single component was used. The test used the method of indoor pot planting. At the time of treatment, abutilon and barnyardgrass were in 6-leaf stage. The test results indicated that when the active component A was mixed with the active component B glyphosate isopropylamine, the herbicidal speeds at different mixing ratios were all obviously better than that of the active component B glyphosate isopropylamine when used alone.

TABLE 11

Control effect of herbicidal composition on weeds (visual observation %)

| | | Abutilon | | | Echinochloacrusgalli | | |
|---|---|---|---|---|---|---|---|
| Medicament | Dose (ga.i./hm²) | 7 days after treatment | 15 days after treatment | 30 days after treatment | 7 days after treatment | 15 days after treatment | 30 days after treatment |
| Component A + component B glyphosate isopropylamine (1:5) | 50 | 61.3 | 66.4 | 65.5 | 37.7 | 72.5 | 90.2 |
|  | 100 | 77.0 | 83.6 | 90.3 | 36.8 | 91.6 | 99.8 |
|  | 200 | 83.2 | 86.0 | 93.2 | 58.0 | 100 | 100 |
|  | 400 | 98.6 | 94.9 | 99.6 | 87.5 | 100 | 100 |
| Component A | 15 | 46.0 | 54.0 | 38.6 | 16.6 | 18.4 | 20.9 |
|  | 30 | 68.1 | 62.4 | 57.3 | 18.0 | 19.8 | 43.2 |
|  | 60 | 82.4 | 93.8 | 100 | 31.0 | 36.7 | 32.9 |
|  | 120 | 94.3 | 100 | 100 | 34.3 | 40.7 | 42.5 |
| Component B glyphosate isopropylamine | 50 | 5.8 | 9.0 | 6.8 | 4.1 | 34.3 | 29.6 |
|  | 100 | 16.2 | 26.2 | 20.0 | 36.9 | 48.7 | 68.5 |
|  | 200 | 24.6 | 38.3 | 62.6 | 62.2 | 63.9 | 100 |
|  | 400 | 43.5 | 38.0 | 79.9 | 66.7 | 64.5 | 99.0 |

It could be seen from the above description that when the corresponding herbicidal formulations were prepared by using the two components of the present application as active components and applied, they also had very obvious synergism, and also reduced the amount of each active ingredient.

What is claimed is:

1. A herbicidal composition for controlling annual and perennial weeds in a garden field and a non-cultivated field, wherein the herbicidal composition comprises an active component A and an active component B;

wherein the active component A has a structure as follows:

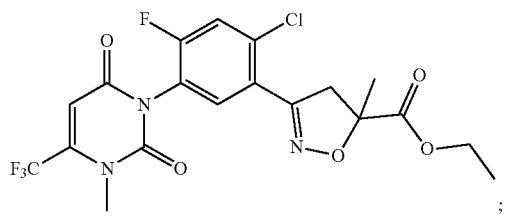 [SMILES: CCOC(=O)C1(C)CC(c2cc(-n3c(=O)cc(C(F)(F)F)n(C)c3=O)c(F)cc2Cl)=NO1]

;

the active component B is one selected from a group consisting of glufosinate-ammonium, Oxyfluorfen, glufosinate-P-ammonium and derivatives thereof, and a mass ratio of the active component A to the active component B is 1: (1.5~2), when the active component B is glufosinate-ammonium or glufosinate-P-ammonium or Oxyfluorfen, the herbicidal composition is used for controlling *Xanthium*, and when the active component B is Oxyfluorfen, the herbicidal composition is used for controlling Amaranthusretroflexus;

wherein the composition excludes glyphosate isopropylamine.

2. A herbicide, comprising the herbicidal composition according to claim 1.

3. The herbicide according to claim 2, wherein a dosage form of the herbicide is water dispersible granules;

in addition to the active component A and the active component B, a raw material for preparing the water dispersible granules further comprises a surfactant, a dispersant, an antagonist, a defoamer, a disintegrant, a binder and a solid carrier.

* * * * *